(12) United States Patent
Kinoshita

(10) Patent No.: US 7,677,821 B2
(45) Date of Patent: Mar. 16, 2010

(54) IMAGE PROCESSING APPARATUS

(75) Inventor: Yoshiaki Kinoshita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 296 days.

(21) Appl. No.: 11/478,614

(22) Filed: Jul. 3, 2006

(65) Prior Publication Data
US 2007/0014616 A1   Jan. 18, 2007

(30) Foreign Application Priority Data
Jul. 12, 2005   (JP) .............................. 2005-202991

(51) Int. Cl.
*G06K 15/00*   (2006.01)
(52) U.S. Cl. .................... 400/62; 358/1.2; 358/2.1; 358/3.26
(58) Field of Classification Search .................... None
See application file for complete search history.

(56) References Cited

U.S. PATENT DOCUMENTS

| | | | | |
|---|---|---|---|---|
| 5,115,255 A | * | 5/1992 | Kobayashi et al. | 347/180 |
| 5,284,816 A | * | 2/1994 | Stephenson | 503/227 |
| 5,398,305 A | * | 3/1995 | Yawata et al. | 358/1.1 |
| 5,954,436 A | * | 9/1999 | Kageyama et al. | 400/188 |
| 6,784,906 B2 | * | 8/2004 | Long et al. | 347/171 |
| 2004/0008365 A1 | * | 1/2004 | Hobbs | 358/1.15 |
| 2004/0125395 A1 | * | 7/2004 | Onishi | 358/1.13 |

FOREIGN PATENT DOCUMENTS

| | | |
|---|---|---|
| JP | 2004-54802 A | 2/2004 |
| JP | 2004-54902 A | 2/2004 |
| JP | 2004-199292 A | 7/2004 |

* cited by examiner

*Primary Examiner*—Jill E Culler
(74) *Attorney, Agent, or Firm*—Sughrue Mion, PLLC

(57) ABSTRACT

The present invention provides an image processing apparatus which can perform image processing suitable for each image in a job as well as provides an image processing program storage medium. The image processing apparatus has an information storage section which stores processing information used for predetermined image processing in memory by associating it with front and back sides of paper each, a color conversion section which performs a color conversion process on an image based on the processing information associated by the information storage section with the front or back side on whichever the image is to be recorded, and a RIP section which converts the image data after color conversion into raster data while performing a correction process on the image data to correct image distortion.

4 Claims, 11 Drawing Sheets

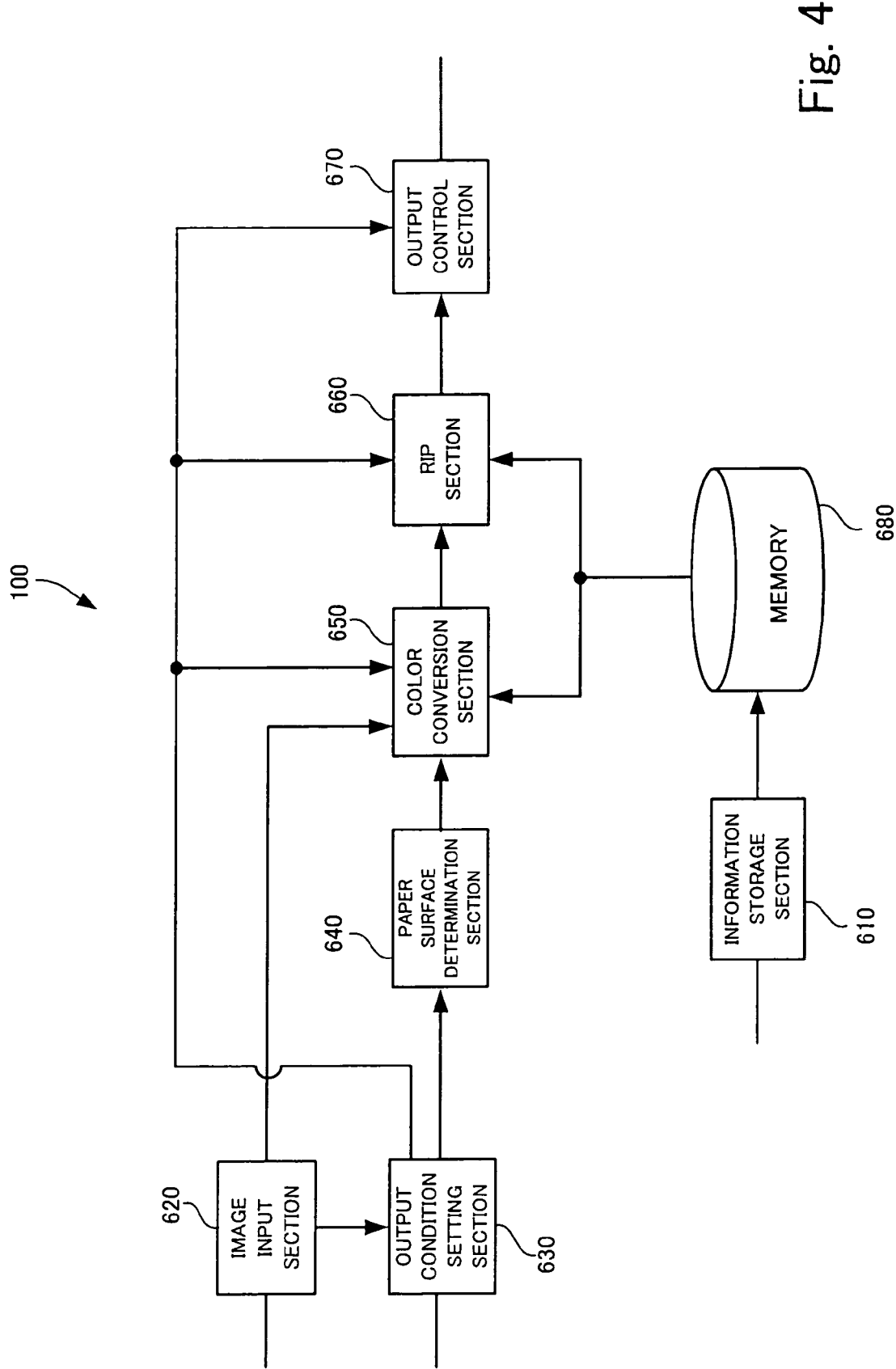

1000

| ITEM | | | | SETTINGS | |
|---|---|---|---|---|---|
| PAPER NAME | | | | COATED PAPER FROM COMPANY A | 721 |
| 710 → | | | | | |
| | | PAPER SURFACE CONDITION | | COATED | |
| 720 → | FRONT SIDE INFORMATION | COLOR CONVERSION INFORMATION | SETTING 1 | PRINTER | PRINTER FROM COMPANY A |
| | | | | OUTPUT PROFILE NAME | PROFILE 1 |
| | | | ⋮ | | 722 |
| | | | SETTING N | PRINTER | PRINTER FROM COMPANY Z |
| | | | | OUTPUT PROFILE NAME | PROFILE N |
| | | EXPANSION/ CONTRACTION INFORMATION | SETTING 1 | INK NAME TO BE USED | INK 1 FROM COMPANY A |
| | | | | EXPANSION/ CONTRAC-TION RATE: X DIRECTION | 98% |
| | | | | Y DIRECTION | 99% |
| | | | ⋮ | | 723 |
| | | | SETTING N | INK NAME TO BE USED | INK 1 FROM COMPANY Z |
| | | | | EXPANSION/ CONTRAC-TION RATE X DIRECTION | 101% |
| | | | | Y DIRECTION | 101% |
| | | PAPER SURFACE CONDITION | | UNCOATED | 731 |
| 730 → | BACK SIDE INFORMATION | COLOR CONVERSION INFORMATION | SETTING 1 | PRINTER | PRINTER FROM COMPANY A |
| | | | | OUTPUT PROFILE NAME | PROFILE 11 |
| | | | ⋮ | | 732 |
| | | | SETTING N | PRINTER | PRINTER FROM COMPANY Z |
| | | | | OUTPUT PROFILE NAME | PROFILE NN |
| | | EXPANSION/ CONTRACTION INFORMATION | SETTING 1 | INK NAME TO BE USED | INK 1 FROM COMPANY A |
| | | | | EXPANSION/ CONTRAC-TION RATE X DIRECTION | 99% |
| | | | | Y DIRECTION | 99% |
| | | | ⋮ | | 733 |
| | | | SETTING N | INK NAME TO BE USED | INK 1 FROM COMPANY Z |
| | | | | EXPANSION/ CONTRAC-TION RATE X DIRECTION | 102% |
| | | | | Y DIRECTION | 102% |
| 800 | PAPER NAME | | | PLAIN PAPER FROM COMPANY B | |
| | ⋮ | | | | |

Fig. 5

| ITEM | | SETTINGS |
|---|---|---|
| PAGE SETTING 1 | PAGE NUMBER | 1 |
| | PAPER TYPE TO BE USED | COATED PAPER FROM COMPANY A |
| | SIZE | A4 |
| | DUPLEX | YES |
| PAGE SETTING 2 | PAGE NUMBER | 2 |
| | PAPER TYPE TO BE USED | COATED PAPER FROM COMPANY A |
| | SIZE | A4 |
| | DUPLEX | YES |
| ⋮ | ⋮ | ⋮ |
| PAGE SETTING N | PAGE NUMBER | 10 |
| | PAPER TYPE TO BE USED | PLAIN PAPER FROM COMPANY B |
| | SIZE | A4 |
| | DUPLEX | NO |

| ITEM | | SETTINGS |
|---|---|---|
| PAGE SETTING 1 | PAGE NUMBER | 1 |
| | PAPER TYPE TO BE USED | COATED PAPER FROM COMPANY A |
| | SIZE | A4 |
| | DUPLEX | YES |
| PAGE SETTING 2 | PAGE NUMBER | 2 |
| | PAPER TYPE TO BE USED | COATED PAPER FROM COMPANY A |
| | SIZE | A4 |
| | DUPLEX | YES |
| PAGE SETTING 3 | PAGE NUMBER | 3 |
| | PAPER TYPE TO BE USED | COATED PAPER FROM COMPANY A |
| | SIZE | A4 |
| | DUPLEX | YES |
| PAGE SETTING 4 | PAGE NUMBER | 4 |
| | PAPER TYPE TO BE USED | PLAIN PAPER FROM COMPANY B |
| | SIZE | A4 |
| | DUPLEX | YES |
| PAGE SETTING 5 | PAGE NUMBER | 5 |
| | PAPER TYPE TO BE USED | PLAIN PAPER FROM COMPANY B |
| | SIZE | A4 |
| | DUPLEX | YES |
| PAGE SETTING 6 | PAGE NUMBER | 6 |
| | PAPER TYPE TO BE USED | PLAIN PAPER FROM COMPANY B |
| | SIZE | A4 |
| | DUPLEX | YES |

Fig. 8

| COATED PAPER FROM COMPANY A (SHEET 1) | FRONT | PAGE 1 |
|---|---|---|
| | BACK | PAGE 2 |
| COATED PAPER FROM COMPANY A (SHEET 2) | FRONT | PAGE 3 |
| | BACK | |
| PLAIN PAPER FROM COMPANY B (SHEET 1) | FRONT | PAGE 4 |
| | BACK | PAGE 5 |
| PLAIN PAPER FROM COMPANY B (SHEET 2) | FRONT | PAGE 6 |
| | BACK | |

902

| ITEM | | SETTINGS |
|---|---|---|
| PAGE SETTING 1 | PAGE NUMBER | 1 |
| | PAPER TYPE TO BE USED | COATED PAPER FROM COMPANY A |
| | SIZE | A4 |
| | DUPLEX | YES |
| PAGE SETTING 2 | PAGE NUMBER | 2 |
| | PAPER TYPE TO BE USED | COATED PAPER FROM COMPANY A |
| | SIZE | A4 |
| | DUPLEX | YES |
| PAGE SETTING 3 | PAGE NUMBER | 3 |
| | PAPER TYPE TO BE USED | COATED PAPER FROM COMPANY A |
| | SIZE | A4 |
| | DUPLEX | YES |
| PAGE SETTING 4 | PAGE NUMBER | 4 |
| | PAPER TYPE TO BE USED | COATED PAPER FROM COMPANY A |
| | SIZE | A4 |
| | DUPLEX | YES |
| PAGE SETTING 5 | PAGE NUMBER | 5 |
| | PAPER TYPE TO BE USED | PLAIN PAPER FROM COMPANY B |
| | SIZE | A4 |
| | DUPLEX | NO |
| PAGE SETTING 6 | PAGE NUMBER | 6 |
| | PAPER TYPE TO BE USED | PLAIN PAPER FROM COMPANY B |
| | SIZE | A4 |
| | DUPLEX | NO |

Fig. 10

| COATED PAPER FROM COMPANY A (SHEET 1) | FRONT | PAGE 1 |
|---|---|---|
| | BACK | PAGE 2 |
| COATED PAPER FROM COMPANY A (SHEET 2) | FRONT | PAGE 3 |
| | BACK | PAGE 4 |
| PLAIN PAPER FROM COMPANY B (SHEET 1) | FRONT | PAGE 5 |
| | BACK | |
| PLAIN PAPER FROM COMPANY B (SHEET 2) | FRONT | PAGE 6 |
| | BACK | |

IMAGE PROCESSING APPARATUS

BACKGROUND OF THE INVENTION

1. Field of the Invention

The present invention relates to an image processing apparatus which performs predetermined image processing on an image and an image processing program storage medium containing an image processing program which makes a computer operate as such an image processing apparatus.

2. Description of the Related Art

Recently, the field of printing has been computerize and it has become common practice for an editor to edit an image to be printed, using an editing computer, check layout of characters, photographs, and the like in the image, and use image data of the final image as a source document. In this type of printing, finishing touches are put to the image to be printed through image processing performed on the image at the data level. Finished quality of the printed matter depends heavily on conditions of paper surfaces such as whether the surfaces of the paper used for printing are coated. Thus, image processing in printing takes the conditions of paper surfaces into consideration.

In the field of printing, it is often the practice to use duplex printing which involves printing images on both sides of paper. Some paper differs in surface conditions between the front and back sides: for example, the front side is coated while the back side is uncoated. On the other hand, in a series of printing operations (a printing job) for a pamphlet, for example, all images are commonly subjected to the same type of image processing in most cases. The image processing includes a color conversion process which consists of adjusting image colors at the data level in order to obtain desirable image colors in printed matter. Thus, in duplex printing, the use of common image processing, i.e., a common color conversion process, for image data for the front and back sides just because the processing is performed in the same job may result in printed matter which differs in coloration between the front and back sides of paper when images are printed. Techniques have been proposed to deal with this situation, including those which regard printing on the front side and printing on the back side as separate jobs, separately perform image processing for the front side by reflecting conditions of the front side and image processing for the back side by reflecting conditions of the back side, and thereby obtain desirable printed matter with images adjusted to desirable coloration on both front and back sides (see, for example, Japanese Patent Laid-Open No. 2004-199292).

Also, it is known that paper often contracts or expands when images are printed on it by an image forming apparatus such as a printer. Such deformation of paper during printing can cause images on the printed matter to contract or expand together with the paper, resulting in distorted images. To deal with this situation, it is conceivable to learn, in advance, a degree of paper expansion/contraction (expansion/contraction rate) which is likely to occur during printing, estimate image distortion resulting from paper deformation during printing based on the expansion/contraction rate, cancel out the estimated distortion by performing a correction process such as expansion or contraction of the images during data-based image processing of the images to be printed on the paper, and thereby correct image distortion caused by paper deformation during actual printing. The paper deformation during printing depends heavily on conditions of paper surfaces such as whether the paper surfaces on which images are to be printed are coated. Thus, in the case of duplex printing on paper whose front and back sides differ from each other in conditions, the use of common image processing, i.e., a common correction process, for image data for the front and back sides can cause distortion to be corrected differently between the front and back sides. Techniques have been proposed to deal with this situation, including those which separately perform image processing for the front side to correct image distortion on the front side and image processing for the back side to correct image distortion on the back side and thereby obtain desirable printed matter with image distortion corrected identically on the front and back sides (see, for example, Japanese Patent Laid-Open No. 2004-54902).

Even in the case of simplex printing, if multiple types of paper are used in a single job, conditions of paper surfaces may vary among images such as paper surfaces for some images are coated while paper surfaces for other images are uncoated. Thus, the use of common image processing including a color conversion process and correction process for all the image data may result in differences in finish among different pieces of printed matter. To deal with this situation, a technique has been proposed which treats preparation of each piece of printed matter as an independent job, perform image processing independently for each piece of printed matter according to the type of paper used for the given piece of printed matter, and thereby obtain multiple pieces of printed matter with preferably finished images.

However, with the above techniques, to give desirable finish to all the images in printed matter produced by duplex printing or by printing on multiple types of paper, the pamphlet designer must set a job for each image by knowing conditions of the paper surface on which the image on each page will be printed. This is troublesome and imposes a great burden on the designer.

SUMMARY OF THE INVENTION

The present invention has been made in view of the above circumstances and provides an image processing apparatus which can perform image processing suitable for each image in a job and an image processing program storage medium containing an image processing program which can make a computer operate as such an image processing apparatus.

The present invention provides an image processing apparatus having:

an information storage section which stores processing information used for predetermined image processing by associating the processing information with front and back sides of paper each; and a processing section which subjects an image to image processing based on the processing information associated by the information storage section with the front or back side on whichever the image is to be recorded.

With the image processing apparatus according to the present invention, the information storage section stores processing information and the like, for example, about a color conversion process and correction process for image distortion during printing according to the conditions of paper surfaces by associating the processing information with front and back sides of paper each. When printing an image on paper, the processing section can perform appropriate processing according to the paper surface conditions by acquiring the processing information associated with the paper surface on which the image will be printed. An exemplary use form of the image processing apparatus according to the present invention will be cited here. First, a designer designs a pamphlet to be created in a job, planning to use plain paper basically, use coated paper with coated surfaces for some pages, and so on. Then, the image processing apparatus internally specifies output conditions of each image such as the type of paper on which the image will be printed and whether the image will be printed on the front side or back side based on the design content, types of paper used in the printing system, order of printing, etc. and performs appropriate image processing according to the output conditions. According to this use form, once the designer designs a pamphlet to be created in the same job, appropriate image processing is performed for the images in the job without the need for the designer to do anything troublesome other than the design. Thus, the image processing apparatus according to the present invention can easily perform appropriate image processing for each image in the same job.

In the image processing apparatus according to the present invention, typically:

the information storage section stores an output profile as the processing information, where the output profile defines correspondence between image data and image colors on an output device which outputs an image on the paper based on the image data, wherein the processing section subjects the image data to a color conversion process based on an output profile associated as the processing information with the front or back side on whichever the image is recorded; or the paper contracts or expands when an image is recorded, wherein the information storage section stores, as the processing information, an expansion/contraction rate of the paper when an image is recorded on the paper, and the processing section subjects an image to an expansion/contraction process based on the expansion/contraction rate associated as the processing information with the side on which the image is outputted.

These forms make it possible to subject the images handled in printing to typical image processing such as a color conversion process according to the conditions of paper surfaces and correction process for image distortion during printing according to the conditions of paper surfaces.

Also, the present invention provides an image processing program storage medium containing an image processing program which is installed on a computer to construct, on the computer:

an information storage section which stores processing information used for predetermined image processing by associating the processing information with front and back sides of paper each; and a processing section which subjects an image to image processing based on the processing information associated by the information storage section with the front or back side on whichever the image is to be recorded.

The image processing program storage medium containing the image processing program according to the present invention makes it possible to easily implement an image processing apparatus which can easily perform image processing needed to give a desirable finish to every image in printed matter in the same job.

Incidentally, only a basic form of the image processing program storage medium according to the present invention is described here, but this is for the purpose of avoiding redundancy, and the image processing program storage medium according to the present invention includes various forms corresponding to the various forms of the image processing apparatus described earlier.

As described above, the present invention makes it possible to easily perform image processing needed to give a desirable finish to every image in printed matter in the same job.

BRIEF DESCRIPTION OF THE DRAWINGS

FIG. 4 is a functional block diagram of the RIP device shown in FIG. 1;

FIG. 5 is a diagram showing an example of a correspondence table of information;

FIG. 7 is a diagram showing an example of output conditions for one job;

FIG. 8 is a condition table which defines output conditions for each of a series of images over six pages;

FIG. 10 is a condition table which defines output conditions different from those in FIG. 8.

DETAILED DESCRIPTION OF THE INVENTION

Embodiments of the present invention will be described below with reference to the drawings.

Figure 1:
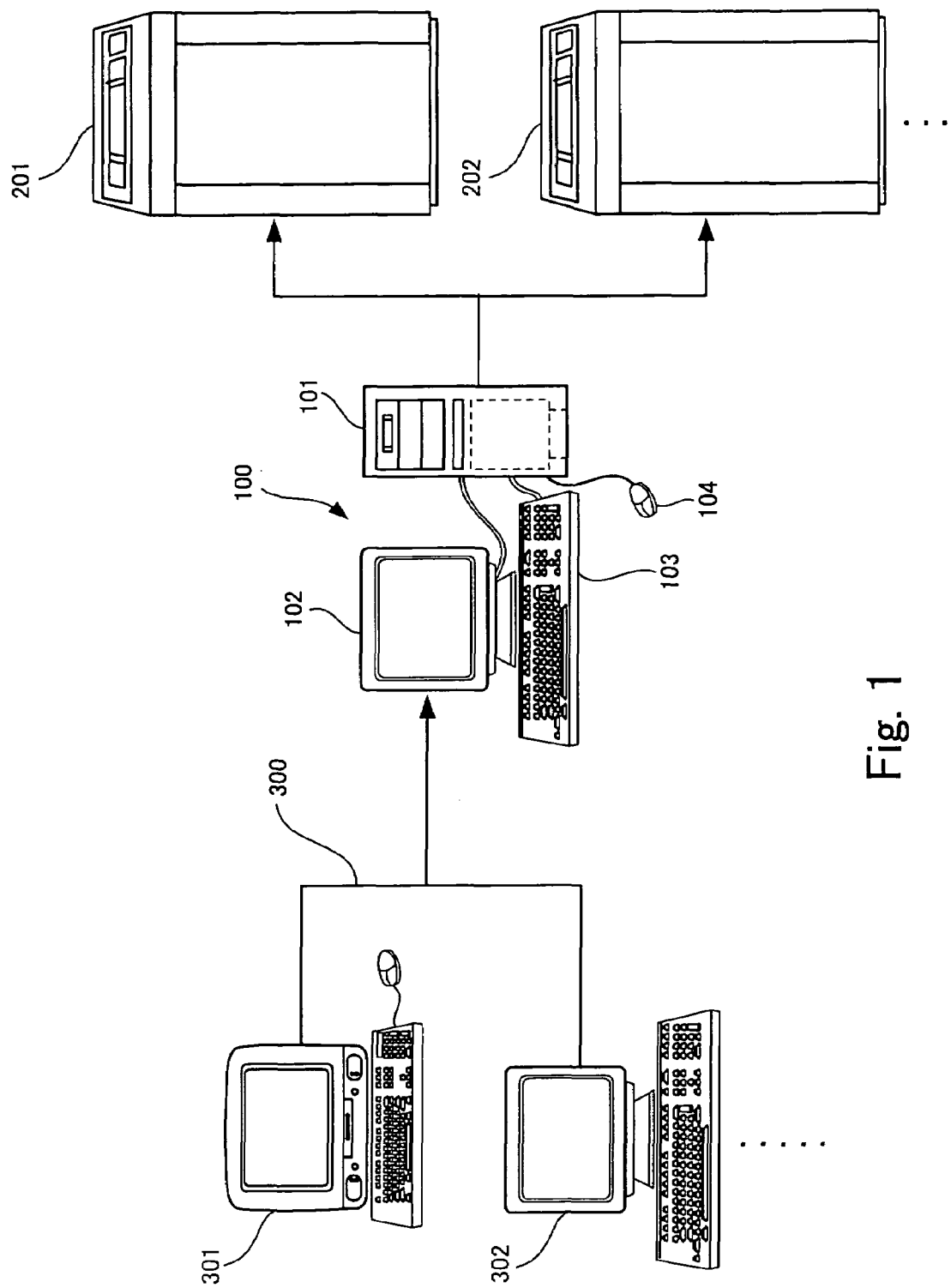
FIG. 1 is a diagram showing a printing system which incorporates an embodiment of the present invention.

FIG. 1 is a diagram showing a printing system which incorporates an embodiment of the present invention.

FIG. 1 shows computers constituting multiple editing devices 301, 302, etc.; a computer constituting a RIP device; and multiple printers 201, 202, etc.

On the editing devices 301, 302, etc., designers edit images to be printed at the data level and the image data of the images are sent to the RIP device 100 via a communications network 300. Also, on the editing devices 301, 302, etc., designers design pamphlets desired to be created, planning, for example, to use plain paper basically, use coated paper with coated surfaces for some pages, and so on. Design information about the design content is sent to the RIP device 100 together with the image data.

The RIP device 100 receives image data from the editing devices 301, 302, etc., performs image processing on the image data (as described later), converts the processed image data into image data (raster data) which express the images as raster images, and outputs the raster data to one of the multiple printers 201, 202, etc. The destination printer of the raster data is specified by an operator on the RIP device 100. Incidentally, a recording medium such as a CD-R (Compact Disc Recordable) or MO (magneto-optical) disk may be used instead of the communications network 300 to deliver the image data.

Among the multiple printers 201, 202, etc., the printer which receives the raster data outputs the images from the raster data to the front or back face of paper using four-colored toner of C (cyan), M (magenta), Y (yellow), and K (black) by electrophotographic method.

A characteristic feature of the printing system according to the embodiment of the present invention shown in FIG. 1 consists in operation of the computer which functions as the RIP device 100. Thus, the description below will focus on the RIP device 100.

The RIP device 100 shown in FIG. 1 is constituted of a computer as described above. The computer is equipped with a CPU, main memory, hard disk, main body 101 with a built in communications board and the like, CRT display 102 which presents images and characters on a display screen by instructions from the main body 101, keyboard 103 for use to enter operator commands and character information into the computer, and mouse 104 used to specify a desired location on the display screen of the CRT display 102 and thereby give a command corresponding to an icon or the like displayed at the specified location.

The main body 101 incorporates a CD-ROM drive on which a CD-ROM 105 (not shown in FIG. 1; see FIG. 2) or CD-R is removably mounted and which reproduces information stored on the CD-ROM 105 or CD-R thus mounted. Also, the main body 101 incorporates an MO drive on which a magneto-optical disk (MO) 106 (not shown in FIG. 1; see FIG. 2) is removably mounted and which records and reproduces information on/from the MO 106 thus mounted.

Figure 2:
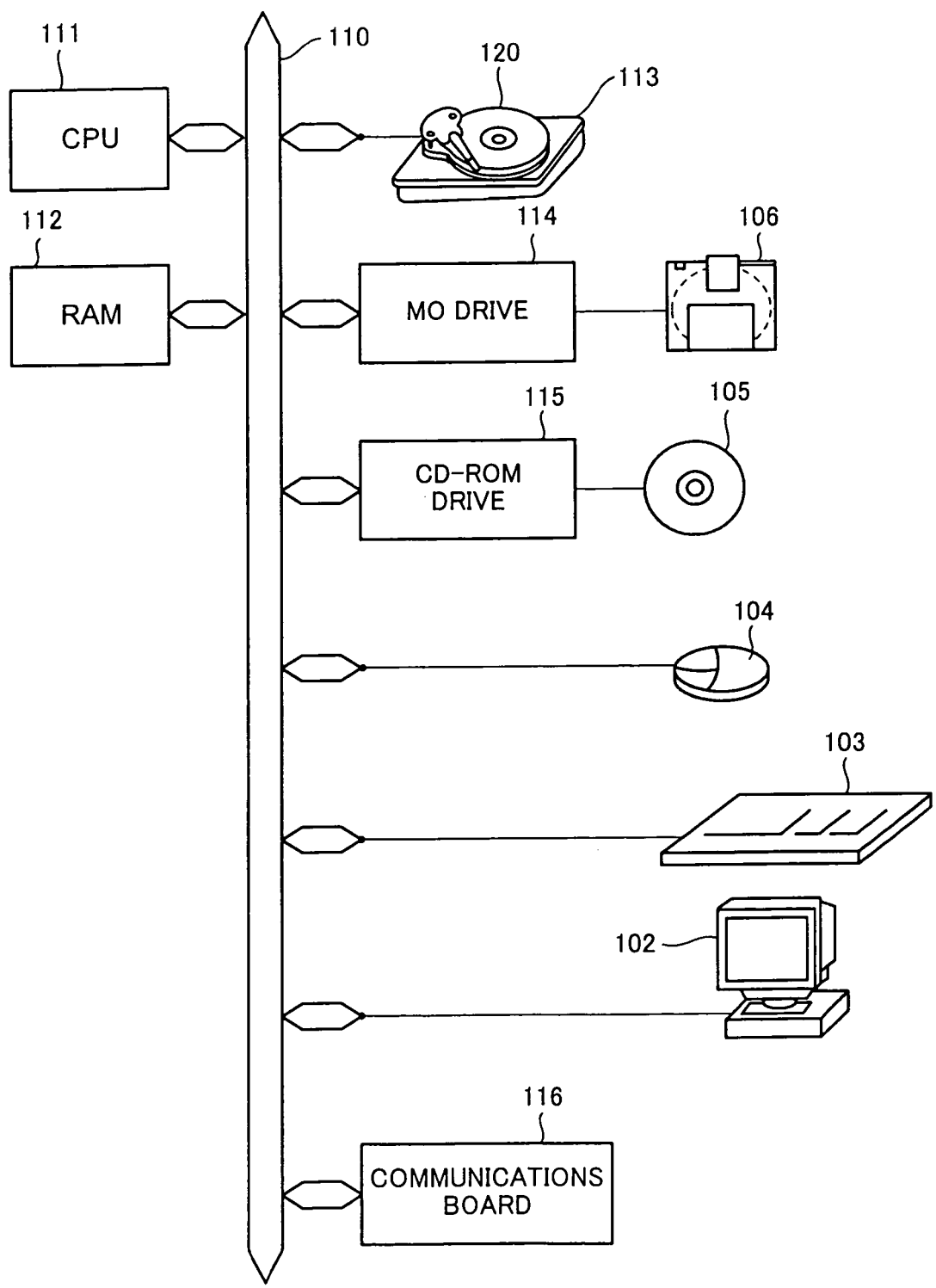
FIG. 2 is a diagram showing a hardware configuration of a computer which constitutes a RIP device.

FIG. 2 is a diagram showing a hardware configuration of a computer which constitutes a RIP device.

The hardware configuration diagram shows a CPU (central processing unit) 111, RAM 112, HDD (hard disk drive) 113, MO drive 114, CD-ROM drive 115, and communications board 116, all of which are interconnected via a bus 110.

The HDD 113 incorporates a hard disk 120 which is a kind of recording medium and records and reproduces information on/from the hard disk 120.

The communications board 116 is connected to a communications line such as a LAN (Local Area Network). The RIP device 100 shown in FIG. 1 can exchange data with other computer systems and output image data to the printers 201, 202, etc. via the communications network 300 connected through the communications board 116.

Also, FIG. 2 shows the mouse 104, keyboard 103, and CRT display 102 (also shown in FIG. 1) connected to the bus 110 via respective I/O interfaces (not shown).

The CD-ROM 105 is an embodiment of the image processing program storage medium according to the present invention. The CD-ROM 105 is mounted in the main body 101 and the image processing program stored on the CD-ROM 105 is read by the CD-ROM drive 115 and installed on the hard disk 120 via the bus 110.

When the image processing program installed on the hard disk 120 is started, the image processing program is loaded onto a RAM 112 from the hard disk 120 and executed by the CPU 111. When the embodiment of the image processing program stored in the image processing program storage medium according to the present invention is started and executed, the RIP device 100 operates as an embodiment of the image processing apparatus according to the present invention.

In FIG. 2, the CD-ROM 105 is cited as a storage medium for use to store the image processing program, but the storage medium for use to store the image processing program according to the present invention is not limited to CD-ROMs. Other storage media such as an optical disk, MO, flexible disk (FD), and magnetic tape may be used alternatively.

Incidentally, in the following description, the same components as those shown in FIG. 1 or 2 will be denoted by the same reference numerals as the corresponding components in FIG. 1 or 2 without special mention.

Figure 3:
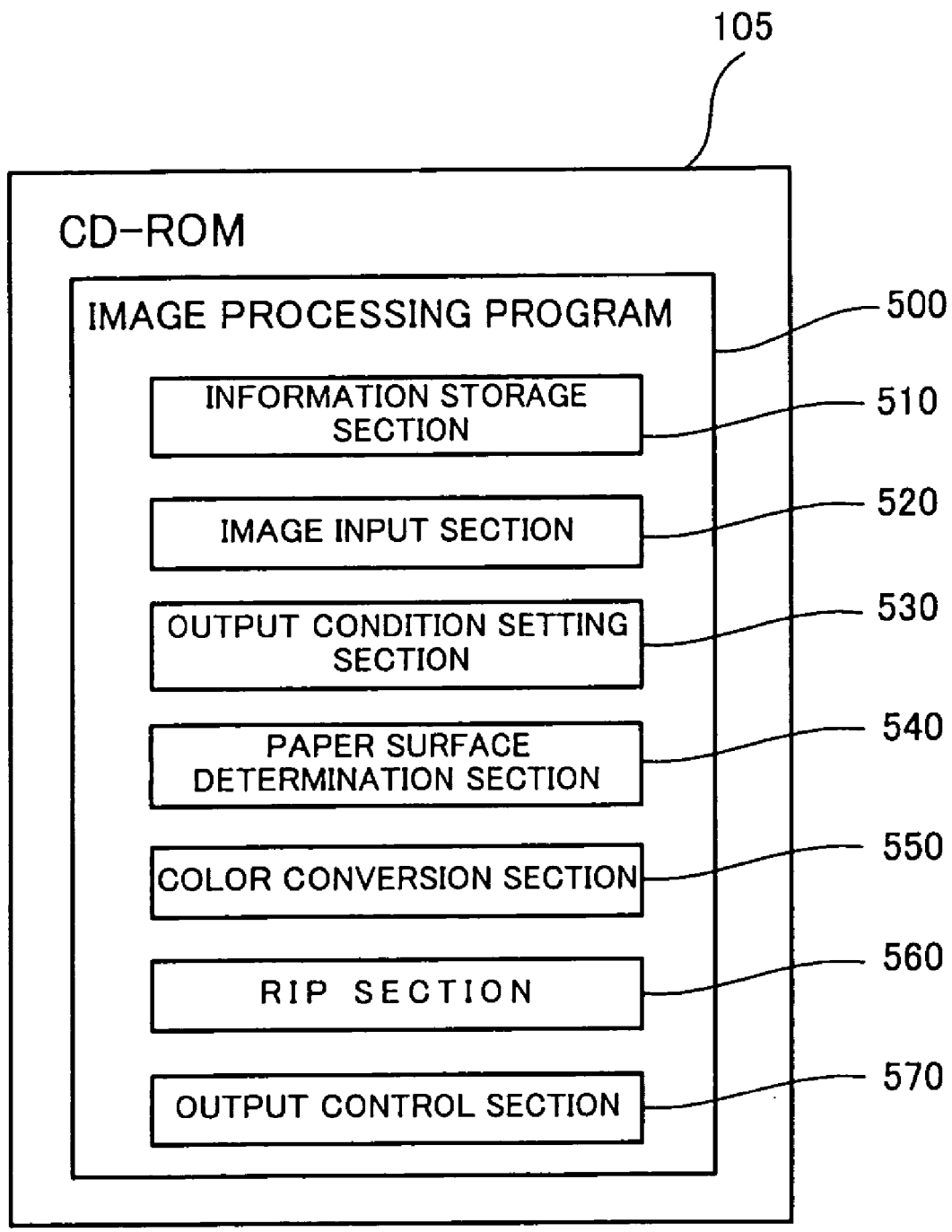
FIG. 3 is a diagram showing an embodiment of an image processing program storage medium according to the present invention.

FIG. 3 is a diagram showing an embodiment of the image processing program storage medium according to the present invention.

FIG. 3 shows an image processing program 500 stored in the CD-ROM 105 which is an embodiment of the image processing program storage medium according to the present invention.

The image processing program 500 is executed on the computer constituting the RIP device 100 shown in FIG. 1 and makes the RIP device 100 operate as an embodiment of the image processing apparatus according to the present invention. It has an information storage section 510, image input section 520, output condition setting section 530, paper surface determination section 540, color conversion section 550, RIP section 560, and output control section 570. Details of the components of the image processing program 500 will be described later.

FIG. 4 is a functional block diagram of the RIP device shown in FIG. 1.

The RIP device 100 is implemented as the image processing program 500 in FIG. 3 is installed and executed on the computer.

The RIP device 100 has an information storage section 610, image input section 620, output condition setting section 630, paper surface determination section 640, color conversion section 650, RIP section 660, output control section 670, and memory 680.

The information storage section 610, image input section 620, output condition setting section 630, paper surface determination section 640, color conversion section 650, RIP section 660, and output control section 670 are constructed on the computer when the information storage section 510, image input section 520, output condition setting section 530, paper surface determination section 540, color conversion section 550, RIP section 560, and output control section 570 of the image processing program 500 in FIG. 3 are incorporated into the computer, respectively. The components in FIG. 4 corresponds to the components in FIG. 3, but they differ in that the components in FIG. 4 consists of a combination of computer hardware and an OS and application programs executed on the computer whereas the components of the image processing program in FIG. 3 consists of only the application programs. The information storage section 610 is an example of the information storage section according to the present invention and a combination of the paper surface determination section 640, color conversion section 650, and RIP section 660 is an example of the processing section according to the present invention.

The information storage section 610 stores information used in a color conversion process to adjust images in printed matter to desirable coloration as well as information used in a correction process to correct image distortion resulting from paper deformation during printing in the memory 680 by associating the two pieces of information with the front and back sides of multiple types of paper in a correspondence table format such as shown below.

FIG. 5 is a diagram showing an example of a correspondence table of information.

The correspondence table 1000 shown in FIG. 5 has respective entry areas for multiple types of paper, such as an entry area 700 for coated paper from company A and entry area 800 for plain paper from company B. Individual items are the same among different entry areas, and thus the entry area 700 for coated paper from company A will be described below representatively.

The entry area 700 includes a paper name field 710, front side information field group 720, and back side information field group 730.

The paper name field 710 contains the name of paper (coated paper from company A, in this case) for which the entry area 700 is provided.

The front side information field group 720 contains information about the front side of paper and back side information field group 730 contains information about the back side of paper. Each of the field groups includes a paper surface condition fields 721 and 731, color conversion information field groups 722 and 732, and expansion/contraction information field groups 723 and 733.

The paper surface condition fields 721 and 731 contain information about the conditions of paper surfaces such as whether the paper surfaces are coated. The color conversion information field groups 722 and 732 contain a name of an output profile which defines correspondence between image data and image colors on each of multiple types of printer. The expansion/contraction information field groups 723 and 733 contain expansion/contraction rates of paper which depends on the type of ink and conditions of paper surfaces, in relation to each of multiple types of ink.

Output profiles for various types of paper, printer, and ink as well as expansion/contraction rates of paper are entered in the information storage section 610 in FIG. 4 by an operator through an input operation of the RIP device 100 (see FIGS. 1 and 2). The information storage section 610 creates a correspondence table such as shown in FIG. 5 using the names for the output profiles and values themselves for the expansion/contraction rates and stores the table in the memory 680. The output profiles themselves whose names are contained in the table are stored in the memory 680 together with the correspondence table. When new information about output profiles or expansion/contraction rates are entered, the information storage section 610 updates the correspondence table in the memory 680 and stores the newly entered output profiles in the memory 680.

The description will be continued by returning to FIG. 4.

The image input section 620, output condition setting section 630, paper surface determination section 640, color conversion section 650, RIP section 660, and output control section 670 shown in FIG. 4 will be described with reference to a flowchart which represents one job of image processing performed by the RIP device 100.

Figure 6:
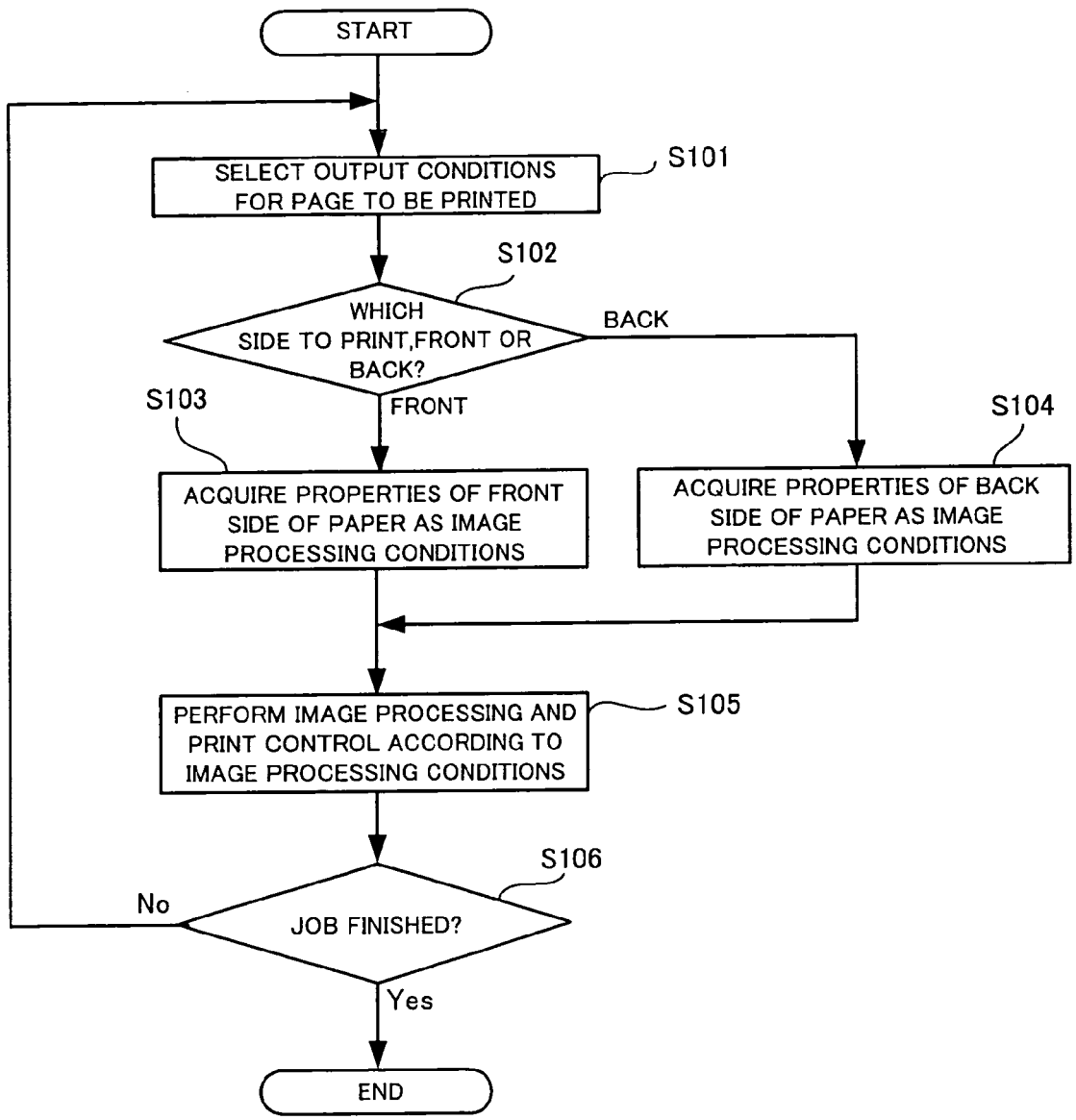
FIG. 6 is a flowchart showing one job of image processing performed by the RIP device shown in FIG. 4.

FIG. 6 is a flowchart showing one job of image processing performed by the RIP device shown in FIG. 4.

The process represented by the flowchart in FIG. 6 is started when image data handled in one job is inputted in the image input section 620 from the editing device 301, 302, or the like (see FIG. 1). Also, design information about design content for the job is inputted in the image input section 620 from the editing devices 301, 302, or the like, giving instructions, for example, to use plain paper basically, use coated paper for printing covers and photographic images in the pamphlet, and use duplex printing basically. The design information is inputted in the image input section 620, and then a series of image data for a series of images handled in the job is inputted in sequence. From the image input section 620, the design information is passed to the output condition setting section 630 and the image data are passed to the color conversion section 650 in sequence.

When the process represented by the flowchart in FIG. 6 is started, the output condition setting section 630 selects output conditions as described below (step S101).

First, based on the design information, the output condition setting section 630 sets output conditions for a series of image handled in the job, in a table format such as shown below.

FIG. 7 is a diagram showing an example of output conditions for one job.

FIG. 7 shows a condition table 900 containing output conditions for each of a series of images over N pages. The condition table 900 contains output conditions $900_1$, $900_2$, ... $900_n$ for images on each of pages 1 to N. Each set of output conditions includes the name of paper to be used, the size of the paper, and a paper-handling option regarding whether to use duplex printing on the paper.

According to this embodiment, output conditions for a job is determined as follows based on design information about the job. Specifically, suppose, for example, design contents represented by design information for a pamphlet of N pages specifies duplex printing on coated paper for page 1 to page N-1 including the covers, and simplex printing on plain paper for page N.

In the output condition setting section 630, the operator of the RIP device 100 selects a destination printer of raster data from the multiple printers 201, 202, etc. connected to the RIP device 100. The output condition setting section 630 prepares printer information including identification information used to identify the selected printer, the type of the printer, and information about the paper to be used such as that basically A4 size paper is used on the printer, that coated paper from company A and plain paper from company B are used.

Upon receiving the design information, the output condition setting section 630 creates a condition table which defines output conditions for the job in a table format, based on the design information and printer information about the specified printer. As an example of the condition table, FIG. 7 shows the condition table 900 containing output conditions which specify duplex printing on A4 size coated paper from company A for page 1 to page N-1, and simplex printing on A4 size plain paper from company B for page N.

The description will be continued by returning to the flowchart in FIGS. 4 and 6.

When output conditions for one job is set as the form of a condition table in step S101 in FIG. 6 as described above, output conditions (e.g., output conditions $900_1$ for the first page in FIG. 6) for the page corresponding to the image data inputted in the image input section 620 are selected and retrieved from the condition table. The output condition setting section 630 passes the retrieved output conditions to the paper surface determination section 640 and passes information about the printer type out of the printer information to the color conversion section 650 and RIP section 660. Also, the output condition setting section passes identification information used to identify the destination printer of raster data out of the printer information to the output control section 670.

Next, the paper surface on which the image will be printed is determined by the paper surface determination section 640 (step S102).

In step S102, the image on the first page is determined to be printed on the front side of the paper of the type indicated by the output conditions. The paper surfaces on which the images on the second and subsequent pages will be printed are determined as follows based on the output conditions for the given page and the paper surface on which the image on the previous page is printed. For example, if the image on the previous page is printed on the front side of a certain type of paper for which duplex printing is specified and if the same type of paper as the previous page and duplex printing are specified by the output conditions for the present page, the image on the present page is determined to be printed on the back side of the same sheet of paper on which the image on the previous page is printed. On the other hand, in cases where the image on the previous page is printed on the back side, where the image on the present page is printed on a different type of paper from a paper for the previous page, or where duplex printing is not specified for the paper on which the image on the present page will be printed, the image on the present page is determined to be printed on the front side of the same/a different type of paper as/from the paper on which the image on the previous page is printed.

Now, concrete examples of how a paper surface is determined based on output conditions will be described below with reference to FIGS. 8 to 11.

Figure 9:
FIG. 9 is a diagram tabulating paper surfaces determined according to the output conditions defined in the condition table shown in FIG. 8.
Figure 11:
FIG. 11 is a diagram tabulating paper surfaces determined according to the output conditions defined in the condition table shown in FIG. 10.

FIG. 8 is a condition table which defines output conditions for each of a series of images over six pages. FIG. 9 is a diagram tabulating paper surfaces determined according to the output conditions defined in the condition table shown in FIG. 8. FIG. 10 is a condition table which defines output conditions different from those in FIG. 8. FIG. 11 is a diagram tabulating paper surfaces determined according to the output conditions defined in the condition table shown in FIG. 10.

In the condition table 901 shown in FIG. 8, coated paper from company A is specified as the paper to be used for images on pages 1 to 3 and plain paper from company B is specified for images on pages 4 to 6. Also, the condition table 901 specifies duplex printing for the images on all the pages.

Based on the output conditions in the condition table 901, the paper surface on which the image on each page will be printed is determined as tabulated in FIG. 9.

Specifically, according to the condition table 901, since the image on page 1 is specified to be printed on coated paper from company A intended for duplex printing, the image on page 1 is determined to be printed on the front side of the first sheet of the coated paper from company A as shown in Table T1 in FIG. 9. Next, the image on page 2 is determined to be printed on the back side of the first sheet of the coated paper from company A on the front side of which the image on page 1 is printed because the same output conditions as the image on page 1 are specified for the image on page 2, which is printed on the printer following the image on page 1. Next, the image on page 3 is determined to be printed on the front side of the second sheet of the coated paper from company A.

For the images on the fourth and subsequent pages, the condition table 901 specifies duplex printing on the plain paper from company B. Thus, the image on page 4 is determined to be printed on the front side of the first sheet of the plain paper from company B rather than the back side of the second sheet of the coated paper from company A on the front side of which the image on page 3 is printed. Similarly, the image on page 5 is determined to be printed on the back side of the first sheet of the plain paper from company B and the image on page 6 is determined to be printed on the front side of the second sheet of the plain paper from company B.

In the condition table 902 shown in FIG. 10, the coated paper from company A is specified as the paper to be used for images on pages 1 to 4 and the plain paper from company B is specified for images on pages 5 and 6. Also, the condition table 902 specifies duplex printing for the paper on which the images on pages 1 to 4 will be printed, and simplex printing for the paper on which the images on pages 5 and 6 will be printed.

Based on the output conditions in the condition table 902, the paper surface on which the image on each page will be printed is determined as shown in table T2 in FIG. 11.

In this example, the paper surfaces on which the images on pages 1 to 4 will be printed are determined in sequence as is the case with the example of the pages 1 to 3 shown in FIGS. 9 and 8, and thus the images on the first and second pages are determined to be printed on the front and back sides of the first sheet of the coated paper from company A, respectively, and the images on pages 3 and 4 are determined to be printed on the front and back sides of the second sheet of the coated paper from company A, respectively.

Next, according to the condition table 902, the images on pages 5 and 6 are specified to be printed on the plain paper from company B intended for simplex printing. Thus, the images on pages 5 and 6 are determined to be printed on the front side of the first and second sheets of the plain paper from company B, respectively.

As described so far, according to this embodiment, when the designer who designs a pamphlet on the editing device 301, 302, or the like (see FIG. 1) specifies the type of paper used for the pamphlet, printing mode such as duplex and simplex, and the like, the RIP device 100 automatically determines the paper surface on which the image on each page will be printed. Accordingly, the burden on the designer can be reduced.

The description will be continued by returning to the flowchart in FIGS. 4 and 6 again.

In step S102 in FIG. 6, the paper surface on which the image will be printed this time out of a series of images printed in the same job is-determined by the paper surface determination section 640. If the result is the front side, the flow goes to step S103. Instep S103, the color conversion section 650 in FIG. 4 determines processing conditions of a color conversion process (described later) for the image data of the image to be printed this time and the RIP section 660 in FIG. 4 determines expansion/contraction rates of the paper used in a correction process (described later) to be performed on the image data after the color conversion.

Of the processes performed in step S103, the process performed by the color conversion section 650 will be described first.

The color conversion section 650 performs a color conversion process on the image data passed in sequence from the image input section 620, based on the output profile corresponding to the paper surface on which each image from the image data will be printed and passes the image data after the color conversion to the RIP section 660. In step S103, the color conversion section 650 determines the output profile. Specifically, the color conversion section 650 searches a correspondence table—such as the one shown in FIG. 5—stored in the memory 680 using the paper surface information (about the front side of a certain type of paper, in step S103) passed by the paper surface determination section 640 and printer type information passed by the output condition setting section 630. By searching the correspondence table, the color conversion section 650 finds the name of the output profile which corresponds to the paper surface (the front side of a certain type of paper) indicated by the information passed from the paper surface determination section 640 and the printer type indicated by the information passed from the output condition setting section 630. Then, the color conversion section 650 reads the output profile of the retrieved name out of the memory 680.

Of the processes performed in step S103, the process performed by the RIP section 660 will be described next.

The RIP section 660, which converts the image data subjected to color conversion and passed in sequence by the color conversion section 650 into raster data and passes the resulting raster data to the output control section 670, performs a correction process (such as described below) during the conversion into raster data. As described above, it is known that paper often contracts or expands when images are printed on it. Accordingly, the images on the paper are contracted or expanded together with the paper and the images are distorted as a result. The RIP section 660 acquires expansion/contraction rates, i.e., the degree of paper expansion/contraction likely to occur during printing, contracts the image during the conversion into raster data if expansion of the paper during printing is expected or expands the image during the conversion into raster data if contraction of the paper during printing is expected, and thereby corrects image distortion resulting from paper deformation during printing. In step S103, the RIP section 660 determines the expansion/contraction rate used in the correction process. The RIP section 660 receives information about the paper surface (information about the front side of a certain type of paper, in step S103) determined by the paper surface determination section 640 from the color conversion section 650 together with the image data. The RIP section 660 searches the correspondence table using the information about the paper surface (the front side of a certain type of paper) and printer type information passed by the output condition setting section 630. According to this embodiment, the printer type information is associated with types of ink used by printers of the type indicated by the information. In the search, the RIP section 660 searches for the expansion/contraction rates corresponding to the ink type indicated by the information passed by the output condition setting section 630 among expansion/contraction rates of the paper surface (the front side of a certain type of paper) indicated by the information passed from the color conversion section 650.

On the other hand, if the paper surface determined by the paper surface determination section 640 in step S102 is the back side, the flow goes to step S104. In step S104, the color conversion section 650 and RIP section 660 obtain an output profile and expansion/contraction rates, respectively, using similar processes as in step S103. However, in step S104, the color conversion section 650 and RIP section 660 respectively obtains the output profile and expansion/contraction rates corresponding to the back side of a certain type of paper unlike in step S103.

After the output profile and expansion/contraction rates are obtained in step S103 or S104, the flow goes to step S105. In step S105, the color conversion section 650 performs a color conversion process on the image data passed by the image input section 620 using the output profile. The image data subjected to the color conversion process is passed to the RIP section 660. Then, the RIP section 660 converts the image data after the color conversion process into raster data while performing a correction process on the image data based on the expansion/contraction rates. The resulting raster data is passed to the output control section 670. The information about the paper surface determined by the paper surface determination section 640 is passed from the RIP section 660 to the output control section 670 together with the raster data. Then, the output control section 670 outputs the raster data passed by the RIP section 660 to the printer indicated by the identification information passed from the output condition setting section 630. Furthermore, the output control section 670 controls operation of the destination printer so that the image will be printed on the paper surface indicated by the information passed by the RIP section 660.

When the process in step S105 is finished, the flow goes to step S106, where it is determined whether the entire series of images inputted in the image input section 620 and intended to be handled in the job have been processed.

The processes in steps S101 to S106 are repeated as long as it is determined in step S106 that the job is still unfinished (No in step S106). If it is determined in step S106 that the job is finished (Yes in step S106), the processes of the flowchart in FIG. 7 is finished.

In this way, with the RIP device 100 according to this embodiment described with reference to FIGS. 1 to 11, once the designer designs a pamphlet to be created in one job, the paper surface on which the image on each page will be printed is determined automatically and the image on each page is subjected to image processing according to the paper surface on which the image will be printed, making it possible to give a desirable finish to the printed matter without the need for the designer to do anything troublesome other than the design.

Thus, the RIP device 100 according to the present invention can easily perform appropriate image processing for each image in the same job.

Although the correspondence table stored in the memory 680 by the information storage section 610 cited as an example of the information storage section according to the present invention defines output profiles and expansion/contraction rates for the front and back sides of each of multiple types of paper, where the output profiles are used in the color conversion process performed to print images on paper with desirable coloration and the expansion/contraction rates represent the degree of paper expansion/contraction occurring during printing, the present invention is not limited to this.

In addition to the output profiles and the expansion/contraction rates of the front and back sides of paper, the correspondence table stored in the information storage section according to the present invention may define, for example, correction coefficients for the front and back sides of each of multiple types of paper, where the correction coefficients will be used in a gradation correction process performed to print images on paper with desirable gradations.

Also, although a combination of the paper surface determination section 640 which determines the paper surface on which the image will be printed, color conversion section 650 which performs a color conversion process according to the paper surface, and RIP section 660 which converts image data into raster data while performing the correction process of correcting image distortion according to the paper surface has been cited as an example of the processing section according to the present invention, the present invention is not limited to this. For example, separate from the conversion into raster data, the processing section according to the present invention may perform image processing, including the color conversion process and correction process, before or after the conversion into raster data.

What is claimed is:

1. An image processing apparatus comprising:
   an information storage section which stores processing information used for predetermined image processing by associating the processing information with front and back sides of paper each; and
   a processing section which subjects an image to image processing based on the processing information associated by the information storage section with the front or back side on whichever the image is to be recorded,
   wherein:
   the paper contracts or expands when an image is recorded;
   the information storage section stores, as the processing information, an expansion/contraction rate of the paper when an image is recorded on the paper; and
   the processing section subjects an image to an expansion/contraction process based on the expansion/contraction rate associated as the processing information with the side on which the image is outputted.

2. The image processing apparatus according to claim 1, wherein the expansion/contraction rate of the paper is based on a paper type of the paper.

3. The image processing apparatus according to claim 1, wherein the expansion/contraction rate of the paper is based on a type of ink used to form the image.

4. The image processing apparatus according to claim 1, wherein the expansion/contraction rate of the paper is based on a type of ink used to from the image and a paper type of the paper.

* * * * *